United States Patent [19]

Natarajan

[11] Patent Number: 5,281,643
[45] Date of Patent: Jan. 25, 1994

[54] THERMOPLASTIC POLYESTER MOLDING COMPOSITIONS CONTAINING QUATERNARY AMMONIUM COMPOUNDS

[75] Inventor: Kavilipalayam M. Natarajan, North Brunswick, N.J.

[73] Assignees: Istituto Guido Donegani S.p.A.; Enichem S.p.A., Italy

[21] Appl. No.: 706,391

[22] Filed: May 28, 1991

[51] Int. Cl.$^5$ .............................................. C08K 5/17
[52] U.S. Cl. .................................. 524/236; 524/99; 524/240; 524/600
[58] Field of Search ...................... 524/236, 240, 600

[56] References Cited

U.S. PATENT DOCUMENTS

| | | | |
|---|---|---|---|
| 3,325,454 | 6/1967 | Nakamura et al. | 260/75 |
| 3,575,931 | 4/1971 | Sherman | 524/383 |
| 3,819,496 | 6/1974 | Roskott | 524/236 |
| 4,035,341 | 7/1977 | Vaginay | 260/75 |
| 4,698,391 | 10/1987 | Yacobucci et al. | 525/162 |

FOREIGN PATENT DOCUMENTS

| | | | |
|---|---|---|---|
| 55894 | 7/1982 | European Pat. Off. | C08L 67/02 |
| 1525124 | 4/1968 | France | C08G 39/00 |
| 7100156 | 6/1982 | Japan . | |

*Primary Examiner*—Paul R. Michl
*Assistant Examiner*—Tae H. Yoon
*Attorney, Agent, or Firm*—Lerner, David, Littenberg, Krumholz & Mentlik

[57] ABSTRACT

A process for increasing the crystallization rate and crystallization temperature of thermoplastic polyesters by incorporating into the polyesters quaternary ammonium salts in amounts effective to increase the crystallization temperatures of the polyesters at least 15° C., which quaternary ammonium salts are substantially free of metal salts of organic acid functional groups. Molding compositions of thermoplastic polyesters and quaternary ammonium salts present in amounts effective to increase the crystallization temperatures of the polyesters at least 15° C.

16 Claims, 5 Drawing Sheets

THERMOPLASTIC POLYESTER MOLDING COMPOSITIONS CONTAINING QUATERNARY AMMONIUM COMPOUNDS

BACKGROUND OF THE INVENTION

The present invention relates to a process for increasing the rate and temperature of crystallization of molding compositions of thermoplastic polyesters such as polyethylene terephthalate (PET) and to molding compositions of thermoplastic polyesters having increased crystallization rates and temperatures. In particular, the present invention relates to molding compositions of thermoplastic polyesters to which a quaternary ammonium salt has been added as a nucleating agent, which nucleating agent increases the crystallization rate and temperature of the polyester.

PET is widely used in the manufacture of molded plastics, films and fibers, because of its excellent physical properties However, the mold processing of PET is inefficient because it has a slow rate of crystallization, requiring high mold processing temperatures and long mold cycling times The crystallization rate and temperature of PET can be increased by the addition of a nucleating agent to a molding composition. Candidate nucleating agents should promote rapid crystallization under conditions of rapid cooling from the melt. The nucleating agent should be highly effective at low concentration in promoting crystallization, and readily dispersible so that rapid and uniform crystallization of the polymer from the melt is possible If the crystallization of PET is slow and if the crystallization process during injection molding is substantially incomplete, then the dimensional stability of the molded parts will be poor. Also, because of the slow crystallization rate of PET, the injection moldability of PET is very poor.

Commonly used nucleating agents are the alkali or alkaline earth metal salts of organic acids For example, U.S. Pat. No. 3,352,904 to Deyrup discloses the use as PET nucleating agents of sodium or potassium salts of carboxylic acids or the salts of organic polymers containing pendant carboxyl groups, including carboxylic acid groups. The use of ionizable metal salts of aromatic rings substituted with acid groups selected from carboxylic acid, sulphinic acid, phosphonic acid, phosphinic acid and phenol groups are disclosed in U.S. Pat. Nos. 4,322,335 and 4,368,288 to Nield, U.S. Pat. No. 4,305,864 to Griffin, U.S. Pat. No. 4,390,493 to Yasui, U.S. Pat. No. 4,393,178 to Legras, EP 21,648 to Biebuyck and EP 351,732 to Karasawa.

U.S. Pat. No. 3,575,931 to Sherman discloses the use of metal salts of carboxylic acids as PET nucleating agents. U.S. Pat. No. 4,401,792 to Axelrod discloses the use of alkali metal salts of polyethylene ionomers and benzoic acid as PET nucleating agents. U.S. Pat. No. 4,425,470 to Garcia discloses the use of alkali metal salts of ethylene terephthalate oligomers as nucleating agents for PET. U.S. Pat. No. 4,551,507 to Haylock discloses the use of alkali or alkaline earth metal carboxylate salts of tertiary or quaternary amines as PET nucleating agents.

U.S. Pat. No. 4,390,493 cited above notes that these nucleating agents are salts of either weak or strong acids. The salts of strong acids cannot be dispersed uniformly in PET, although their crystallization acceleration effect is great. This causes nonuniform crystallization, which, as discussed above, reduces the impact resistance and other properties of articles molded from the PET. While salts of weak acids disperse more uniformly through the PET, their crystallization acceleration effect is poor, requiring large quantities of these nucleating agents to be added to the polymer, which also hinders the uniform dispersion of these nucleating agents and consequently the uniformity of the crystallization of the polymer.

A PET nucleating agent that was not a metal salt of an organic acid would be highly desirable, so that the nucleating agent would be capable of being more uniformly dispersed in the PET.

SUMMARY OF THE INVENTION

It has now been discovered that the crystallization rate and temperature of thermoplastic polyesters such as PET can be increased by incorporating quaternary ammonium salts into polyester molding compositions. The quaternary ammonium salts do not have the drawbacks of the metal salts of organic acids and disperse uniformly throughout the polyester so that the polyester crystallizes rapidly and uniformly upon cooling.

Therefore, according to the present invention, there is provided a molding composition containing a thermoplastic polyester and a quaternary ammonium salt present in an amount effective to increase the crystallization temperature of the polyester at least 15° C., which quaternary ammonium salt is substantially free of metal salts of organic acid functional groups.

Also, according to the present invention, there is provided a process for increasing the crystallization rate and crystallization temperature of thermoplastic polyesters by incorporating therein a quaternary ammonium salt in an amount effective to increase the crystallization temperature of the polyester at least 15° C.

Unlike the ionic nucleating agents of the prior art, the quaternary ammonium salts are not metal salts of acids, and therefore do not possess the disadvantages of these materials disclosed by U.S. Pat. No. 4,390,493, discussed above.

DETAILED DESCRIPTION OF THE PREFERRED EMBODIMENT

Figure 1:
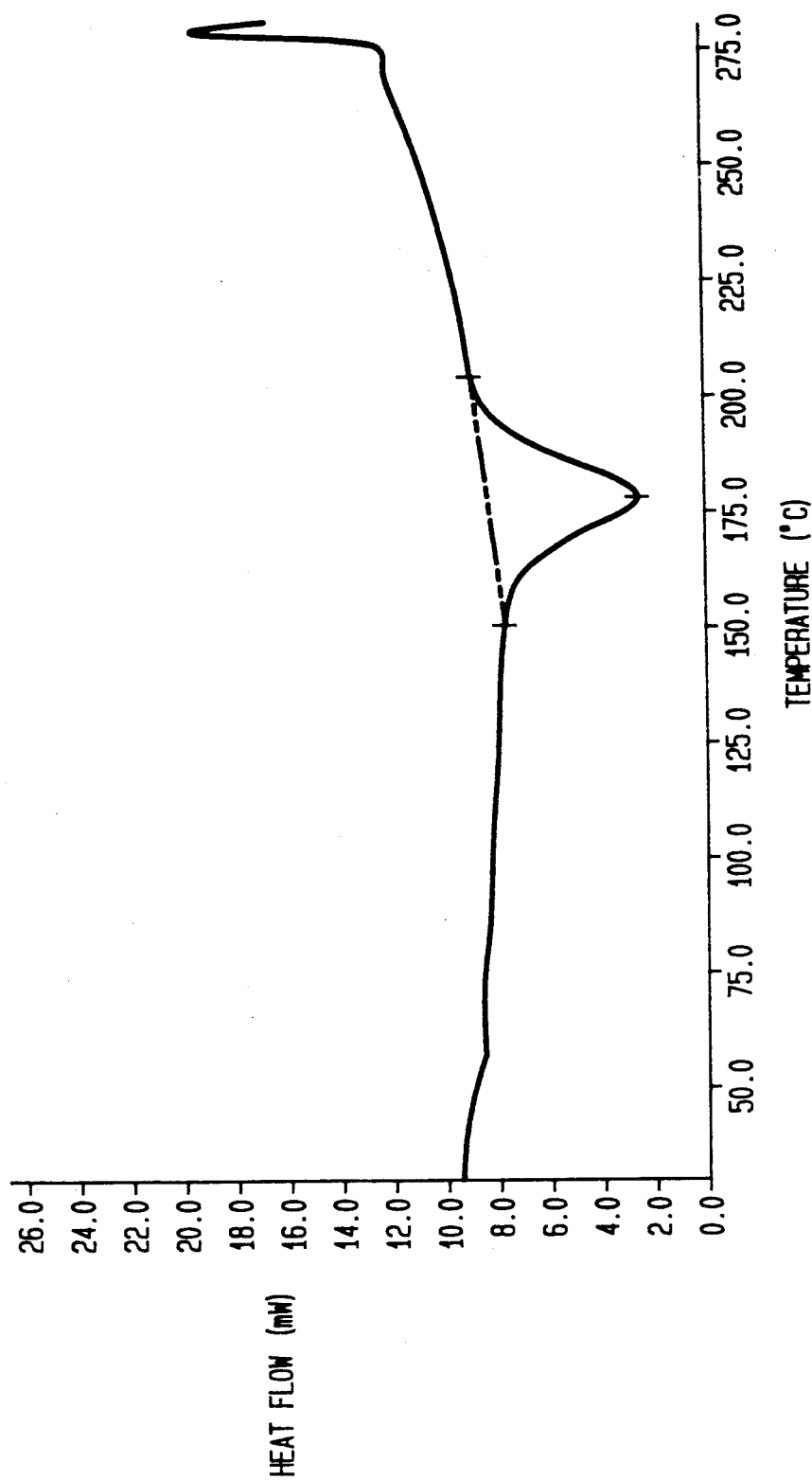
FIG. 1 is a differential scanning calorimetry (DSC) thermogram (cooling) of a PET polymer having no nucleating agent incorporated therein.

The resins utilized in the molding compositions of the present invention are thermoplastic polyesters. Preferred polyesters include the condensation products of dicarboxylic acids and diols. The dicarboxylic acid component of more preferred polyesters contain at least 20 percent aromatic dicarboxylic acids selected from terephthalic acid, isophthalic acid, napthalene dicarboxylic acid, diphenylether dicarboxylic acid, diphenyl dicarboxylic acid, diphenylsulfone dicarboxylic acid, diphenoxyethane dicarboxylic acid, and the like. The non-aromatic component of the dicarboxylic acid is selected from succinic acid, adipic acid, sebacic acid and the like.

The diol component of more preferred polyesters may be selected from aliphatic diols containing from 2 to 10 carbon atoms. Such diols include ethylene glycol, diethylene glycol, trimethylene glycol, tetramethylene glycol, and the like.

Even more preferred polyesters are poly(alkylene terephthalates) characterized in general by the structural units of Formula I:

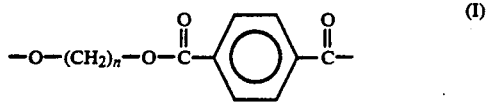

wherein n is an integer between 2 and 6. The most preferred polyester is PET.

Suitable thermoplastic polyesters are further characterized as having intrinsic viscosities between about 0.4 and about 1.5 g/dL and preferably between about 0.6 and about 1.1 g/dL. The intrinsic viscosity is obtained by extrapolation of viscosity values to zero concentration of solutions of the polyester in a 60/40 vol./vol. ratio blend of 1,1,2,2-tetrachloroethane and phenol at 25° C. Essentially, any thermoplastic polyester suitable for use in molding compositions can be utilized with the present invention. Such polyesters are taught by U.S. Pat. No. 2,465,319 and may be derived by the preparation methods disclosed therein and by U.S. Pat. No. 3,047,539, both of which are hereby incorporated herein by reference thereto.

Because the increase in crystallization temperature and rate is derived from the quaternary ammonium group, virtually any quaternary ammonium salt is suitable for use in the invention. The quaternary ammonium salt should be capable of increasing the crystallization temperature of the polyester at least 15° C. at a level no greater than five parts per hundred parts of polyester. Few, if any, quaternary ammonium salts fail to meet the above requirement. Greater quantities of quaternary ammonium salt can be used to obtain greater increases in the crystallization temperature of the polyesters.

The ability of a given quantity of a quaternary ammonium salt to increase the crystallization temperature of a polyester can be readily determined without undue experimentation by Differential Scanning Calorimetry. The quaternary ammonium salt and polyester are compounded in accordance with the present specification and then a 10 mg chip is heated to 280° C. at a rate of 20° C./minute and then cooled at a rate of 20° C./minute. By measuring the temperature of maximum heat evolution, the temperature at which crystallization takes place is readily determined.

As noted above, the quaternary ammonium salts of the present invention do not possess the disadvantages of the prior art organic acid metal salts. Therefore, the quaternary ammonium salts utilized with the present invention should be substantially free of metal salts of organic acids. In addition to compounds having single quaternary ammonium groups, the quaternary ammonium salts suitable for use in the present invention include bis-quaternary ammonium compounds, as well as polyquaternary and poly(bis-quaternary) materials.

The salts formed by the quaternary ammonium cations of the present invention can be formed with both organic and inorganic anions. Therefore, the quaternary ammonium salts of the present invention include compounds such as tetraoctylammonium bromide, as well as ammonium benzoate.

Preferred quaternary ammonium salts useful in the polyester molding compositions of the present invention have the structure of Formula II:

wherein $R_1$, $R_2$, $R_3$ and $R_4$ are independently selected from hydrogen, straight chained or branched alkyl or alkylene groups, aromatic and non-aromatic rings and fused ring systems, and lower alkyl esters of straight-chained or branched alkyl or alkylene carboxylic acids or ring-substituted carboxylic acids. $X^\ominus$ represents a salt-forming anion. More preferably, at least one of $R_1$, $R_2$, $R_3$ and $R_4$ is not hydrogen. Alkyl and alkylene groups are defined as containing from 1 to 18 carbon atoms; lower alkyl groups are defined as containing from 1 to 6 carbon atoms. The aromatic and non-aromatic rings and fused ring systems may optionally contain one or more heteroatoms selected from N, S or O. As noted above, R, $R_2$, $R_3$ and $R_4$ do not include metal salts of organic acids. $X^\ominus$ is preferably an anion selected from halides, halates, perhalates, halites and hypohalites of fluorine, chlorine, bromine and iodine, nitrate, nitrite, cyanate, thiocyanate, permanganate, hydroxide, carboxylate, phenolate and the like. Preferred carboxylate anions include acetate and benzoate anions.

Compounds of Formula II suitable for use with the present invention include those compounds in which the quaternary nitrogen and two of $R_1$, $R_2$, $R_3$ and $R_4$ a members of an aromatic or nonaromatic ring or fused ring system, which ring or ring system may optionally contain additional heteroatoms selected from N, O, or S. For example, the quaternary nitrogen and two of $R_1$, $R_2$, $R_3$ and $R_4$ can form a quaternary pyridinium ring.

The molding compositions of the present invention should contain at least that amount of quaternary ammonium salt effective to increase the crystallization temperature of the thermoplastic polyester at least 15° C. This will also result in an increase in the crystallization rate. As the amount of quaternary ammonium salt is increased, the crystallization rate and temperature of the polyester will increase. Preferably, the molding composition will contain from about 0.1 to about 5.0 percent by weight of the quaternary ammonium salt, based on the weight of the thermoplastic polyester. More preferably, the molding composition will contain between about 1 and about 2 weight percent of the quaternary ammonium salt.

Examples of quaternary ammonium salts suitable for use as polyester nucleating agents in the present invention include, but are not limited to, N-octadecyltrimethylammonium bromide, tetraoctyl-ammonium bromide, tetrapentylammonium bromide, myristyltrimethylammonium bromide, ammonium benzoate, and the like.

The molding compositions of the present invention are suitable for use in the production of molded articles using conventional molding apparatus. As such, the molding composition can optionally contain amounts up to about 50 percent based on the weight of the polyester of art-recognized additives such as pigments, fillers, stabilizers, fire retardants, lubricants, vulcanizing agents, antidegradants, antioxidants, processing aids, adhesives, tackifiers, plasticizers, prevulcanization inhibitors, discontinuous fibers such as wood or cellulose fibers, extender oils, mold release agents, accelerators, impact modifiers and other nucleating agents.

The process of this invention can be carried out using any art-recognized method for incorporating a nucleating agent into a polyester resin. The quaternary ammonium salts can be added at any time during the preparation of the molding composition, or they also can be added to the molding composition while it is molten after it has been fully prepared just prior to molding. For example, the polyester, quaternary ammonium salt and any other components can be dry blended at room temperature followed by melt mixing using any conventional melt mixing apparatus, including extruders, calendars, kneaders and the like, at a temperature above the softening point of the polyester, and preferably between about 200° C. and 300° C. The quaternary ammonium salt can also first be dry blended with an optional component such as a filler or impact modifier before dry blending or melt mixing with the polyester. Alternatively, the polyester, quaternary ammonium salt and other components can be brought together in a melt compounder and extruded. The compositions can then be pelletized for molding purposes.

The molding compositions of the present invention can be directly injection molded, melt spun, cast or extruded. The compositions of the present invention are particularly useful to make injection molded articles.

The following non-limiting examples set forth hereinbelow illustrate certain aspects of the invention. All parts and percentages are by weight unless otherwise noted and all temperatures are in degrees Celsius.

EXAMPLES

In the examples, samples of PET containing various quaternary ammonium salt nucleating agents were prepared and the induction of crystallinity for each was determined by DSC (cooling) using a Perkin-Elmer 7 Series Thermal Analysis System. A 10 mg chip sample of a PET molding composition was heated to 280° C. at a rate of 20° C./min. and then cooled at a rate of 20° C./min. By measuring the heat evolved, the temperature at which the induction of crystallinity occurs, as well as the temperature of maximum heat evolution, indicative of the temperature at which the crystallization takes place, can be readily determined.

EXAMPLES 1-7

Blends of PET and various quaternary ammonium salts were prepared according to the weight-percent formulations listed in Table I, with Example 1 prepared as a control. The PET had an intrinsic viscosity of 0.62 g/dL measured in a 60/40 vol./vol. ratio blend of 1,1,2,2-tetrachloroethane and phenol at 25° C.

The samples were extruded using a Leistritz twin-screw extruder and pelletized. The melt temperature was 280° C. The pellets were dried for 24 hours at 120° C. prior to injection molding with a Nissei 80T Injection Molding Machine. Test specimens such as tensile bars, flexural bars and discs were molded. The melt temperature was 280° C. The injection pressure was 8000 psi. The total cycle time for molding was 60 seconds.

Figure 2:
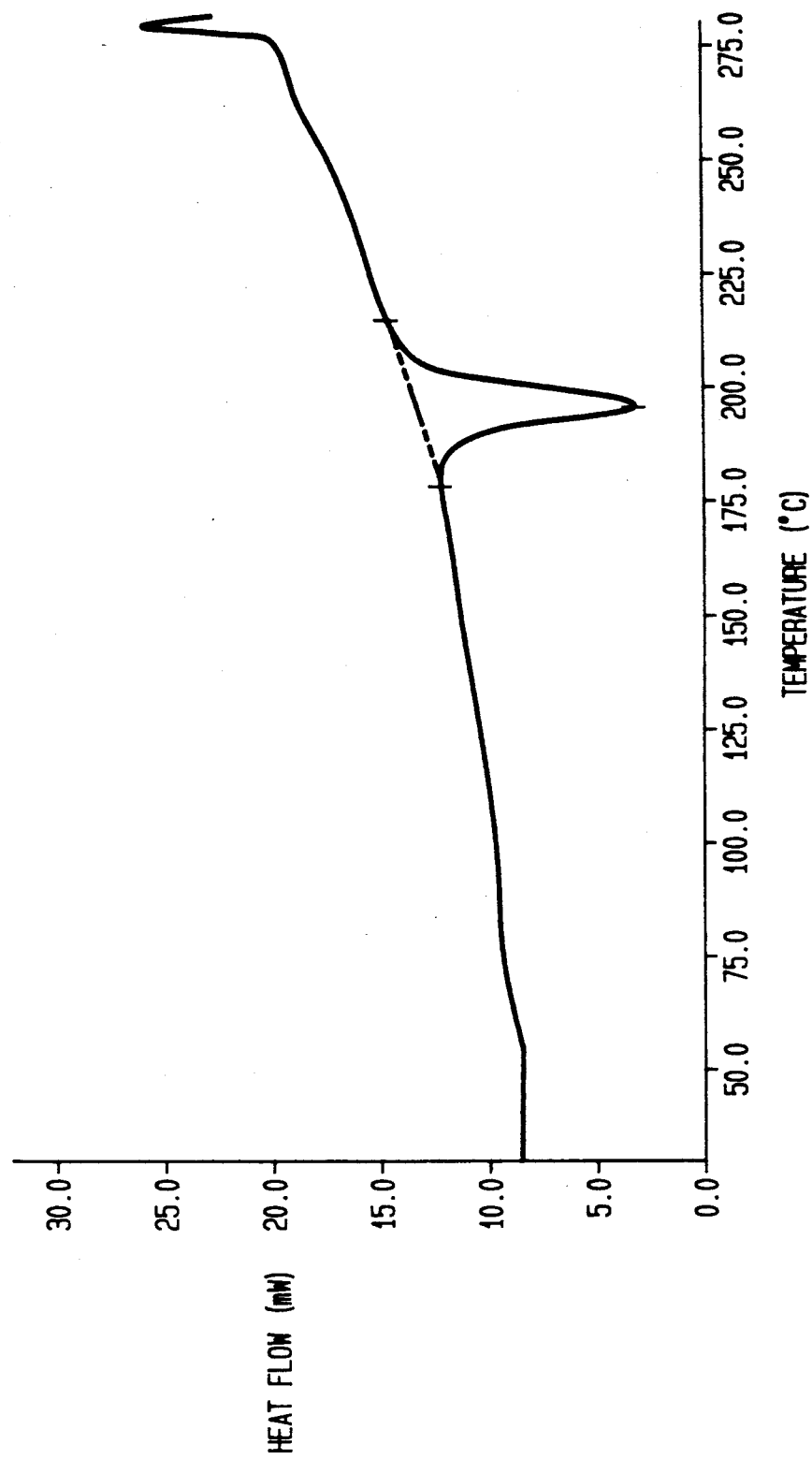
FIG. 2 is a DSC thermogram (cooling) of the same PET polymer with 0.5 percent ammonium benzoate added as a nucleating agent.
Figure 3:
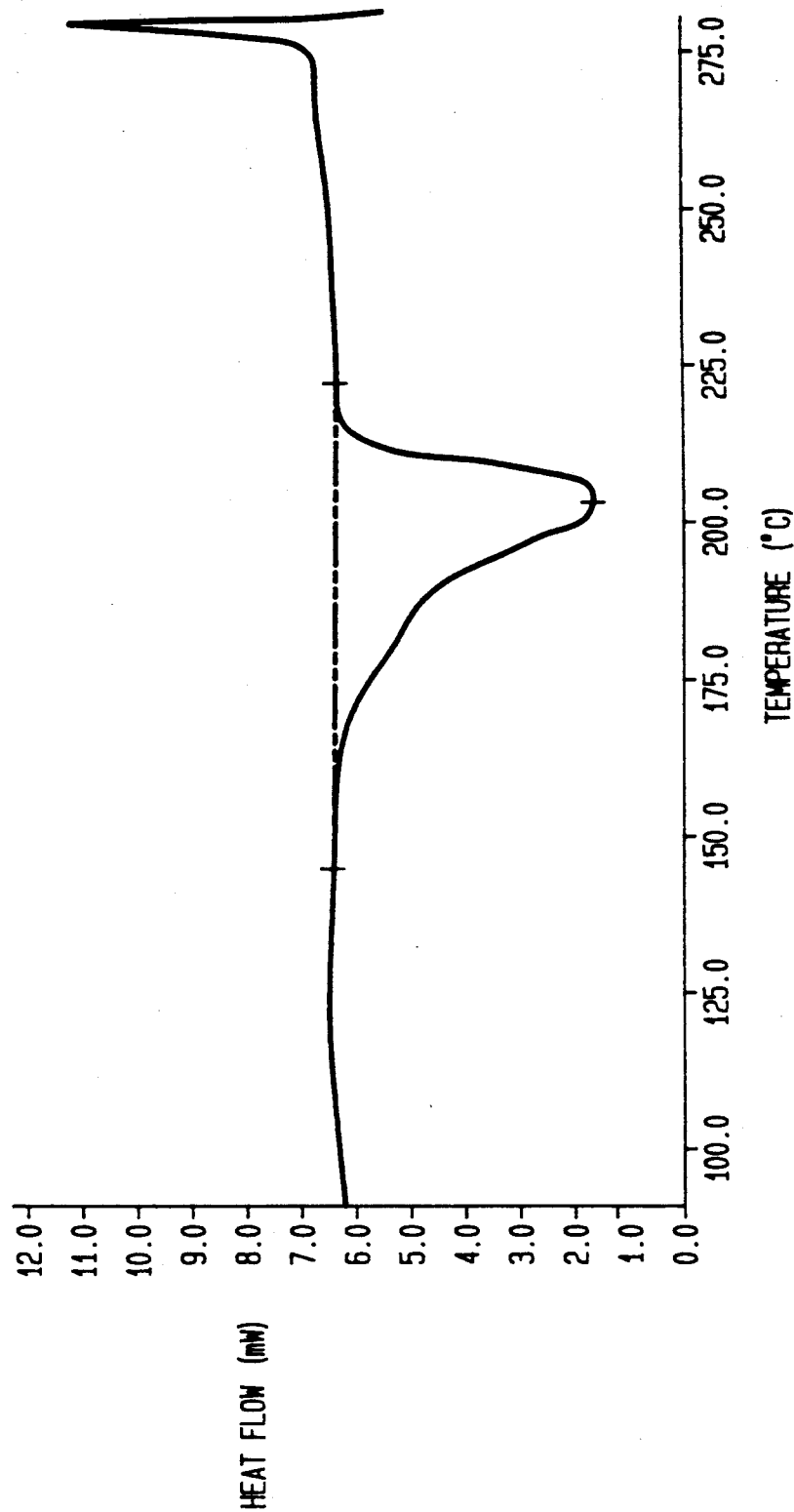
FIG. 3 is a DSC thermogram (cooling) of the same PET with 1 percent tetraoctylammonium bromide added as a nucleating agent.
Figure 4:
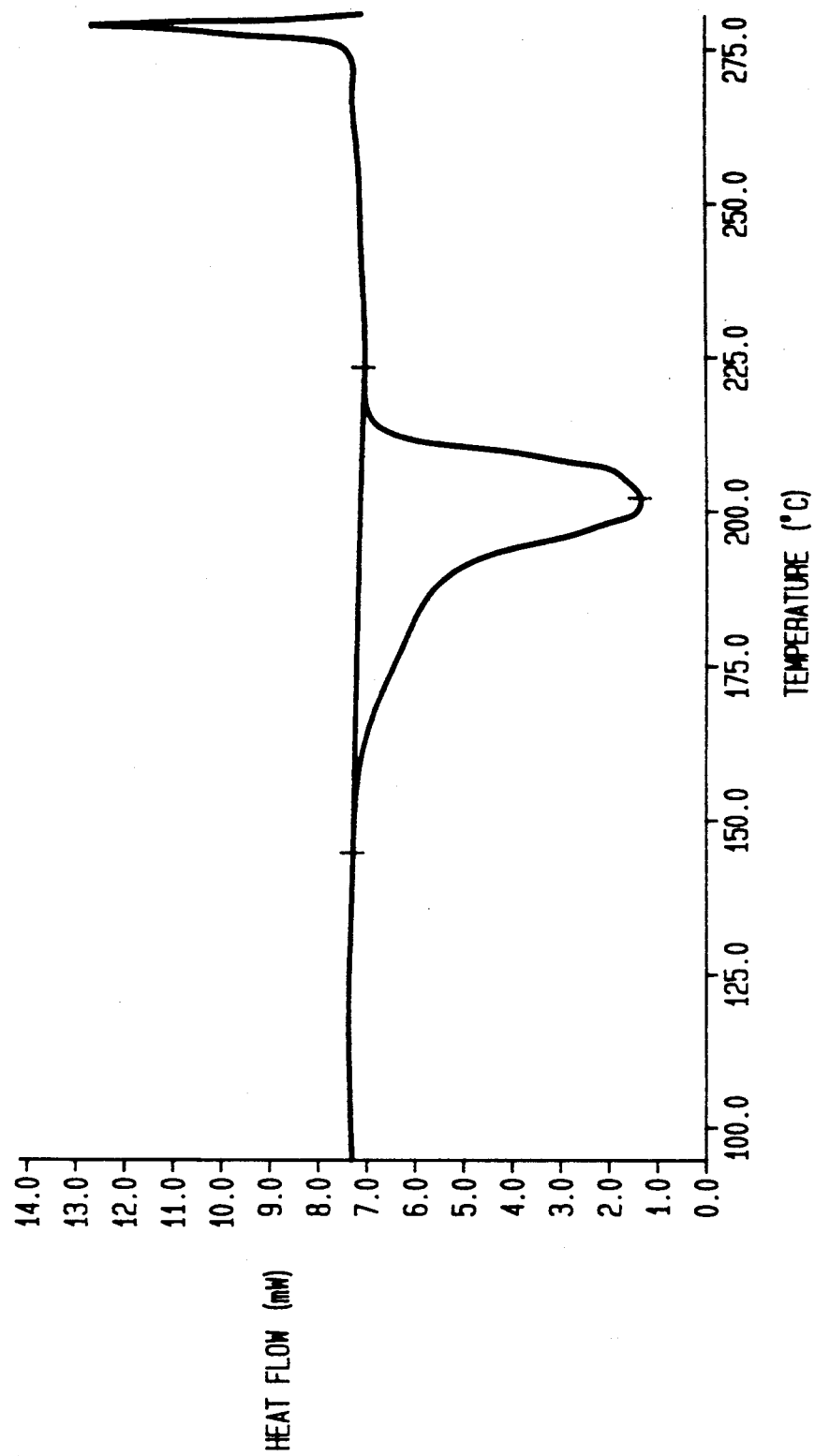
FIG. 4 is a DSC thermogram (cooling) of the same PET with 1 percent tetrapentylammonium bromide added as a nucleating agent.
Figure 5:
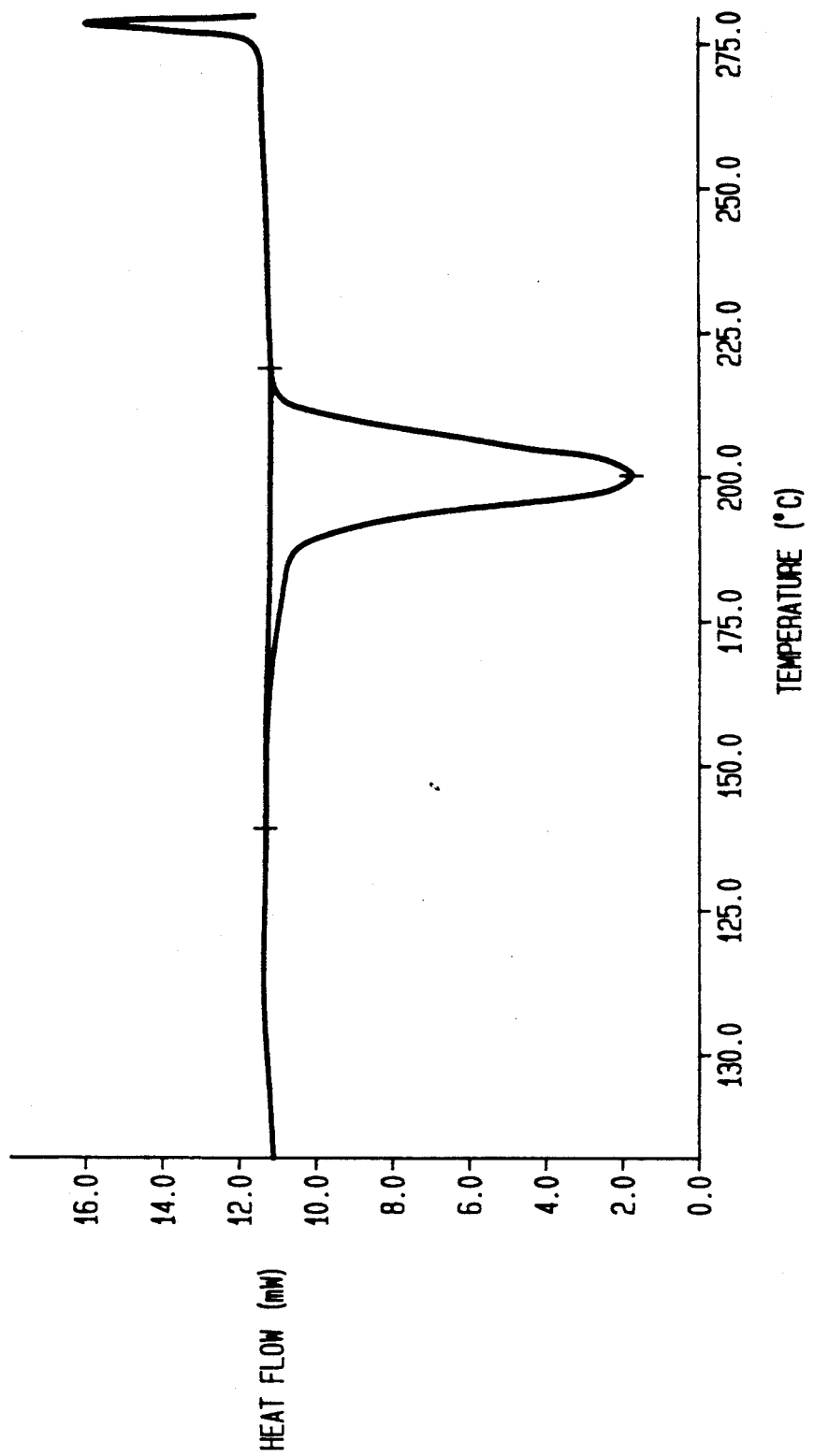
FIG. 5 is a DSC thermogram (cooling) for the same PET with 1 percent myristyltrimethylammonium bromide added as a nucleating agent.

Thermal analysis of the PET molding composition by DSC was performed as described above. DSC thermograms (cooling) for the samples of Examples 1 and 4-7 are shown in FIGS. 1-5. The crystallization temperatures of the PET samples of Examples 1-7 are shown in Table I. The data show that the quaternary ammonium compounds increase the crystallization rate of the PET considerably. The articles molded from the molding compositions of Examples 2-7 exhibited superior dimensional stability and reduced warpage over the PET control of Example 1.

TABLE 1

CRYSTALLIZATION TEMPERATURES FOR THE PET/QUATERNARY AMMONIUM COMPOUNDS

| FORMULATION | CRYSTALLIZATION TEMPERATURE |
| --- | --- |
| PET | 177.0° C. |
| PET + 0.25% N-OCTADECYL-TRIMETHYL AMMONIUM BROMIDE | 193° C. |
| PET + 0.5% N-OCTADECYL-TRIMETHYL AMMONIUM BROMIDE | 198° C. |
| PET + 0.5% AMMONIUM BENZOATE | 195.5° C. |
| PET + 1% TETRAOCTYL AMMONIUM BROMIDE | 202.5° C. |
| PET + 1% TETRAPENTYL AMMONIUM BROMIDE | 200.7° C. |
| PET + 1% MYRISTYLTRIMETHYL AMMONIUM BROMIDE | 200.2° C. |

It will accordingly be appreciated, in accordance with this invention, that both the rate and temperature of crystallization of PET can be significantly increased by incorporating quaternary ammonium salts into polyester molding compositions. The foregoing description of the preferred embodiment should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A molding composition comprising a thermoplastic polyester and a quaternary ammonium salt present in an amount effective to increase the crystallization temperature of said polyester at least 15° C., wherein said quaternary ammonium salt is characterized by the formula:

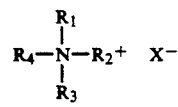

wherein $R_1$, $R_2$, $R_3$ and $R_4$ are independently selected from the group consisting of hydrogen, straight-chain or branched alkyl and alkylene groups, aromatic and non-aromatic rings and fused ring systems and lower alkyl esters of straight-chained or branched alkyl or alkylene carboxylic acids or aromatic ring-substituted carboxylic acids, wherein said rings and fused ring systems optionally contain one or more heteroatoms selected from the group consisting of N, S and O, and said alkyl or alkylene groups have from 1 to 18 carbon atoms, provided that at least one of $R_1$, $R_2$, $R_3$ and $R_4$ is not hydrogen; or the quaternary nitrogen and two of $R_1$, $R_2$, $R_3$ and $R_4$ are members of an aromatic or non-aromatic ring or fused ring system, which ring or ring systems optionally contain one or more heteroatoms selected from the group consisting of N, S and O; and $X^-$ is a salt-forming anion.

2. The composition of claim 1, wherein said thermoplastic polyester is a polyester of an aromatic dicarboxylic acid.

3. The composition of claim 2, wherein said polyester is a poly(alkylene terephthalate) comprising repeating units of the formula:

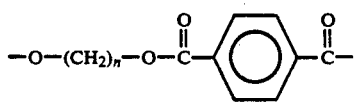

wherein n is an integer between two and six.

4. The composition of claim 3, wherein said polyester is PET.

5. The composition of claim 1, wherein said thermoplastic polyester has an intrinsic viscosity between about 0.4 and about 1.5 g/dL measured in a 60/40 vol.-/vol. ratio blend of 1,1,2,2-tetrachloroethane and phenol at 25° C.

6. The composition of claim 5, wherein said polyester has an intrinsic viscosity between about 0.6 and about 1.1 g/dL measured in a 60/40 vol./vol. ratio blend of 1,1,2,2-tetrachloroethane and phenol at 25° C.

7. The molding composition of claim 1, wherein $X^-$ is an anion selected from the group consisting of halides, halates, perhalates, halites and hypohalites of fluorine, chlorine, bromine and iodine, nitrate, nitrite, cyanate, thiocyanate, permanganate, hydroxide, carboxylate and phenolate.

8. The molding composition of claim 1, wherein said quaternary ammonium salt is selected from the group consisting of N-octadecyl-trimethyl ammonium bromide, ammonium benzoate, tetraoctylammonium bromide, tetrapentylammonium bromide and myristyltrimethylammonium bromide.

9. The molding composition of claim 1, wherein said quaternary ammonium salt is present in an amount from about 0.1 to about 5.0 percent by weight of said polyester.

10. The molding composition of claim 9, wherein said quaternary ammonium salt is present in an amount from about 1.0 to about 2.0 percent by weight of said polyester.

11. A molded article prepared from the molding composition of claim 1.

12. A process for increasing the crystallization rate and crystallization temperature of a thermoplastic polyester, which process comprises incorporating into said polyester, a quaternary ammonium salt in an amount effective to increase the crystallization temperature of said polyester at least 15° C., which quaternary ammonium salt is characterized by the formula:

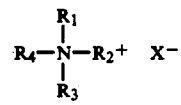

wherein $R_1$, $R_2$, $R_3$ and $R_4$ are independently selected from the group consisting of hydrogen, straight-chained or branched alkyl and alkylene groups, aromatic and non-aromatic rings and fused ring systems and lower alkyl esters of straight-chained or branched alkyl or alkylene carboxylic acids or aromatic ring-substituted carboxylic acids, wherein said rings and fused ring systems optionally contain one or more heteroatoms selected from the group consisting of N, S and O, and said alkyl or alkylene groups have from 1 to 18 carbon atoms, provided that at least one of $R_1$, $R_2$, $R_3$ and $R_4$ is not hydrogen; or the quaternary nitrogen and two of R1, R2, R3 and R4 are members of an aromatic or non-aromatic ring or fused ring system, which ring or ring systems optionally contain one or more heteroatoms selected from the group consisting of N, S and O; and $X^-$ is a salt-forming anion.

13. A process according to claim 12, wherein said quaternary ammonium salt is incorporated into said polyester at a temperature between about 200° C. and about 300° C.

14. A process according to claim 12, wherein said incorporating step comprises incorporating into said polyester from about 0.1 to about 5.0 percent by weight of said polyester of said quaternary ammonium salt.

15. A process according to claim 12, wherein said polyester has an intrinsic viscosity between about 0.4 and about 1.5 g/dL measured in a 60/40 vol./vol. ratio blend of 1,1,2,2-tetrachloroethane and phenol at 25° C.

16. A process according to claim 12, wherein said polyester is PET.

* * * * *